United States Patent [19]
Tsuchiya et al.

[11] 3,904,051
[45] Sept. 9, 1975

[54] SAFETY DEVICE FOR PREVENTING UNDESIRED MOVEMENT OF THREE-POINT HITCH-MOUNTED BACKHOE FRAME

[75] Inventors: William Sadayuki Tsuchiya, East Moline, Ill.; Bradley Joseph Schnittjer, Delhi, Iowa

[73] Assignee: Deere & Company, Moline, Ill.

[22] Filed: Dec. 20, 1974

[21] Appl. No.: 534,690

[52] U.S. Cl............. 214/138 R; 280/446 A; 172/7
[51] Int. Cl.[2]........................................ E02F 3/16
[58] Field of Search........... 280/461 R, 461 A, 432, 280/446 R, 446 A; 172/7, 9, 11, 12; 214/138, 762

[56] References Cited
UNITED STATES PATENTS

| | | | |
|---|---|---|---|
| 2,633,367 | 3/1953 | Annis | 280/461 R |
| 2,890,805 | 6/1959 | Pilch | 214/762 X |
| 3,074,109 | 7/1962 | Holopainen | 280/477 X |
| 3,653,446 | 4/1972 | Kalmon | 172/9 |

Primary Examiner—Leo Friaglia
Assistant Examiner—R. Schrecengost

[57] ABSTRACT

A backhoe frame is connected to a tractor through means of a conventional three-point hitch provided on the tractor. When the backhoe frame is properly disposed for operation, the lower draft links of the three-point hitch are substantially horizontally disposed. To prevent the backhoe frame from being lifted by actuation of any of the hydraulic actuators of the backhoe and thus from being guided upwardly and rearwardly toward the tractor by the three-point hitch, a mechanical linkage is connected between the backhoe and the three-point hitch so as to actuate a dump valve for routing pressure fluid, normally provided for operating the hydraulic actuators, to a reservoir in response to the backhoe frame reaching a predetermined position relative to the tractor.

9 Claims, 4 Drawing Figures

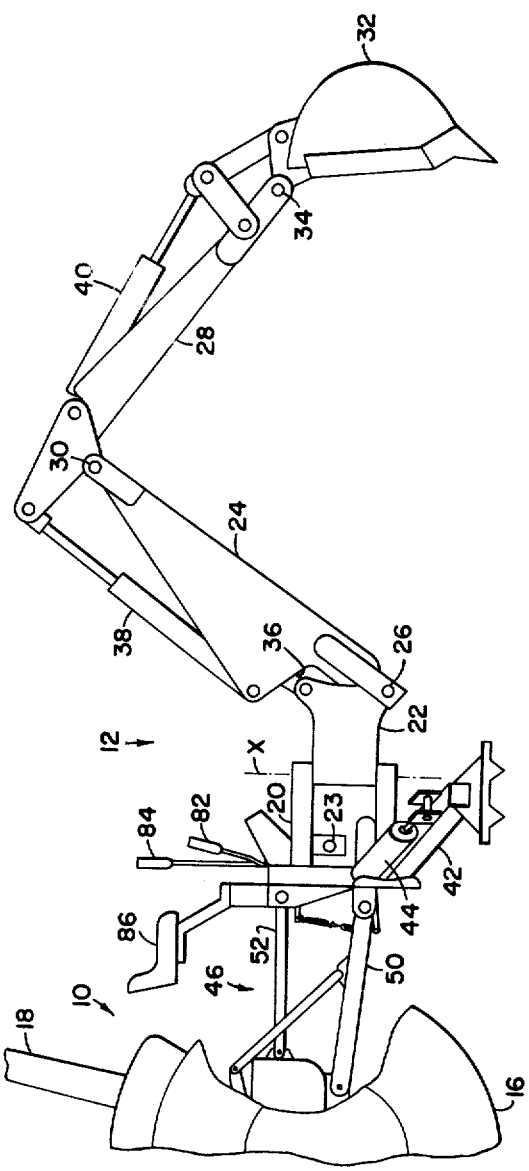
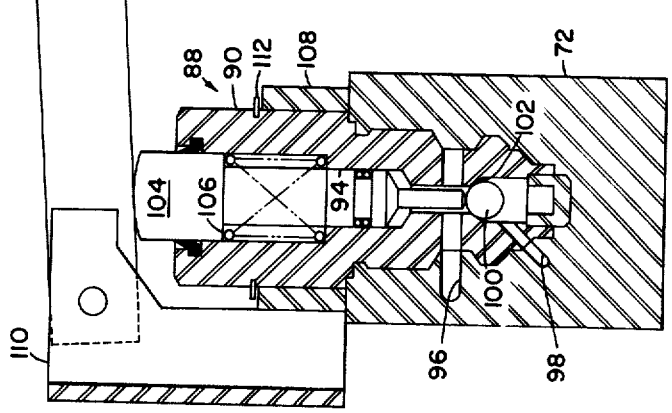
FIG. 1
FIG. 3

3,904,051

SAFETY DEVICE FOR PREVENTING UNDESIRED MOVEMENT OF THREE-POINT HITCH-MOUNTED BACKHOE FRAME

BACKGROUND OF THE INVENTION

The present invention relates to a tractor and backhoe combination and more particularly relates to a combination of a tractor provided with a three-point hitch and a backhoe connected to the tractor through means of the three-point hitch.

Agricultural and utility types or classes of tractors are often provided with a three-point hitch to which various implements may be connected in integral or semi-integral relation with the tractor. These tractors are normally provided with a hydraulic system including a lift cylinder or actuator which is coupled to the lower links of the three-point hitch for effecting selected raising and lowering of the links to thus effect vertical adjustment of an implement coupled to the hitch.

Included in the various implements adapted to be connected to the three-point hitch of a tractor is the backhoe. A backhoe normally includes a main frame which connects to the tractor three-point hitch and supports an operator's seat and control levers for operating valving for controlling the routing of exhaust and pressure fluid to and from hydraulic actuators respectively provided for controlling the boom, dipper stick, bucket and stabilizer legs of the backhoe. During normal operation of the backhoe, the weight of the backhoe is supported mainly by the stabilizer legs; and the three-point hitch of the tractor is in a lowered operating position wherein the lower draft links thereof are disposed substantially horizontally.

Heretofore, the connection of a backhoe to a tractor through means of a three-point hitch has not proved to be entirely satisfactory. Specifically, operators may, in an attempt to force the backhoe bucket into hard material or in an attempt to move the tractor by using the backhoe as a pry, actuate actuators of the backhoe such that a reactive force is induced which results in the three-point hitch being forced upwardly from its normal operating position. This is undesirable since the seat in which the operator is seated is raised along with the three-point hitch and is guided thereby towards the back of the tractor and if the tractor if provided with a structure such as a roll-over protective frame or a cab or the like, the operator may be forced against such structure and injured. Further, even if the tractor is not provided with a structure apt to be contacted by the operator, the use of the backhoe as a pry may overstress and fail the connecting points of the hitch with the tractor or backhoe.

SUMMARY OF THE INVENTION

According to the present invention there is provided a safety device for preventing the aforementioned undesirable conditions in the operation of a backhoe coupled to a tractor through means of a three-point hitch.

A broad object of the invention is to provide a safety device which prevents an operator from actuating any of the backhoe actuators so as to effect elevation of the three-point hitch beyond a predetermined amount from its normal operating position. More specifically, it is an object to provide such a safety device which includes a sensor for sensing the position of the main frame of the backhoe relative to the tractor, a dump valve for routing the working fluid of the actuators of the backhoe to a reservoir and a position responsive means coupled between the sensor and the dump valve for actuating the dump valve in response to the hitch moving said predetermined amount from its operation position.

Still a more specific object is to provide a safety device as described in the preceding paragraph wherein the sensor and position responsive means comprise a mechanical linkage arranged such that it is operated by relative movement between the main frame of the backhoe and the three-point hitch as the latter moves upwardly from its normal operating position.

Yet another object is to provide a safety device including a mechanical linkage as described in the preceding paragraph wherein the linkage includes a length-adjustable link so that the linkage may be properly positioned relative to the three-point hitch when the latter is in its operating position.

These and other objects will become apparent from a reading of the following description in view of the appended drawings.

BRIEF DESCRIPTION OF THE DRAWINGS

FIG. 1 is a side elevational view of a tractor-backhoe combination embodying a safety device constructed according to the principles of the present invention, but showing only the rearmost portion of the tractor and with parts thereof broken away for clarity.

FIG. 3 is a sectional view of a dump valve forming part of the safety device.

DESCRIPTION OF THE PREFERRED EMBODIMENT

Figure 2:
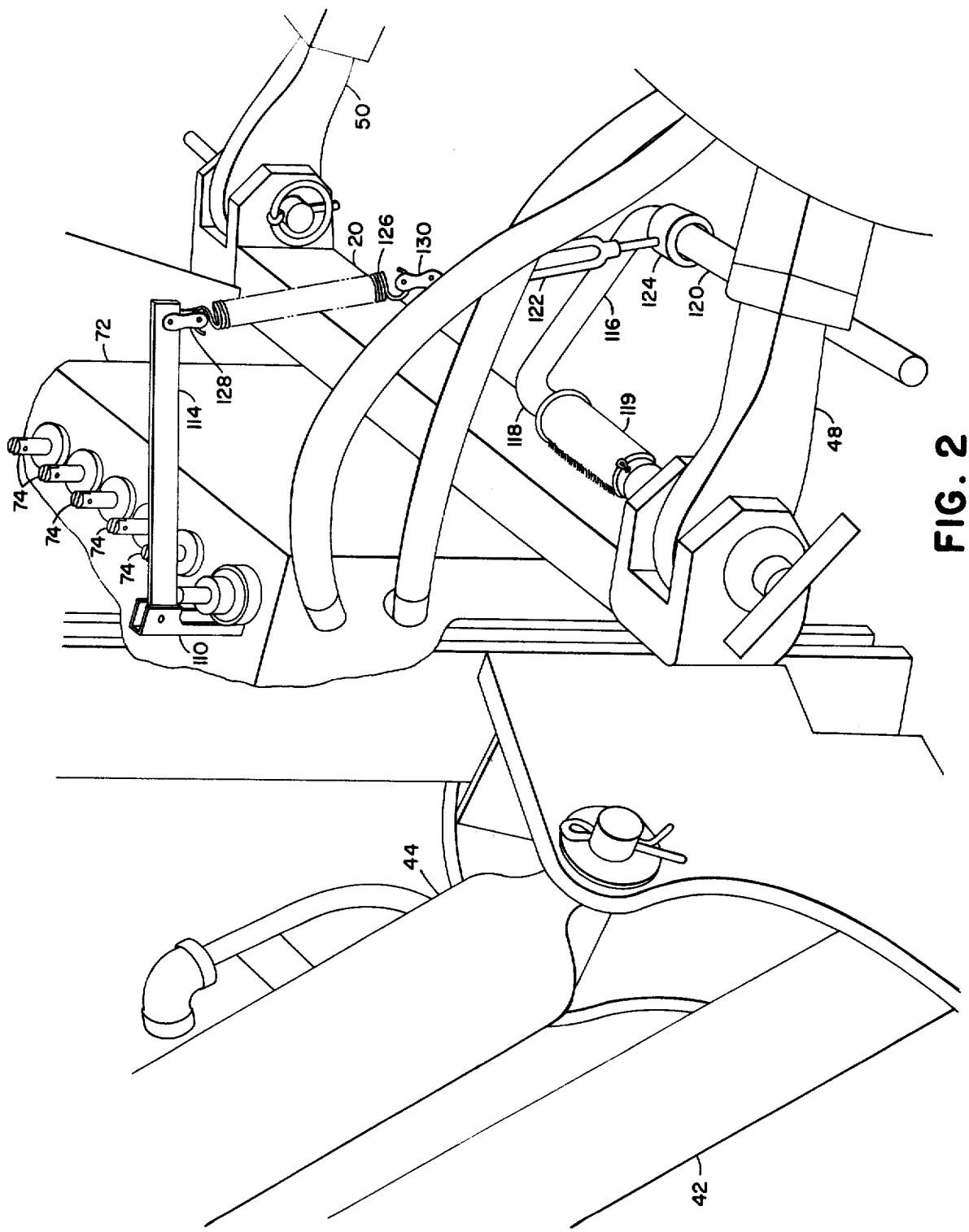
FIG. 2 is a perspective view with some parts broken away and others omitted for clarity showing the safety device of the present invention in conjunction with the backhoe main frame and the rear end portions of the lower draft links of the three-point hitch.

Referring now to the drawings, there is shown (FIG. 1) the rear end portion of a tractor, and a conventional backhoe, respectively designated in their entirety by the reference numerals 10 and 12. The tractor 10 includes a chassis 14 supported on a pair of rear drive wheels 16, only the right wheel being shown. Partially shown is a roll-over protective frame 18 mounted on the chassis 14.

The backhoe 12 includes a main frame 20 which supports a swing frame 22 for pivotal movement about a vertical axis X, such pivotal movement being controlled by conventional means (not shown) powered by a horizontal, transverse double-acting hydraulic actuator 23 located forwardly of the frame 22. A boom 24 is vertically pivotally mounted on the swing frame 22 through means of a horizontal pivot connection 26 located at the forward end of the boom 24, as considered in the forward direction of travel of the tractor 10. A dipper stick 28 is in turn vertically pivotally mounted on the rearward end of the boom 24 through means of a pivot connection 30 spaced rearwardly from the forward end of the dipper stick 28 and a bucket 32 is vertically pivotally mounted on the rear end of the boom 24 through means of a pivot connection 34. For the purpose of selectively pivoting the boom 24, dipper stick 28 and bucket 32 relative to one another, there are provided first, second and third double-acting hydraulic actuators 36, 38 and 40, respectively, connected between the swing frame 22 and boom 24, between the boom 24 and dipper stick 28 and between the dipper stick 28 and bucket 32.

Mounted on the right and left sides of the main frame 20 for vertical swing movement about respective oblique pivot axes (not shown) are right and left stabilizer legs 42. The stabilizer legs are selectively swung through means of a pair of double-acting hydraulic actuators 44 respectively connected between the legs 42 and the frame 20.

Figure 4:
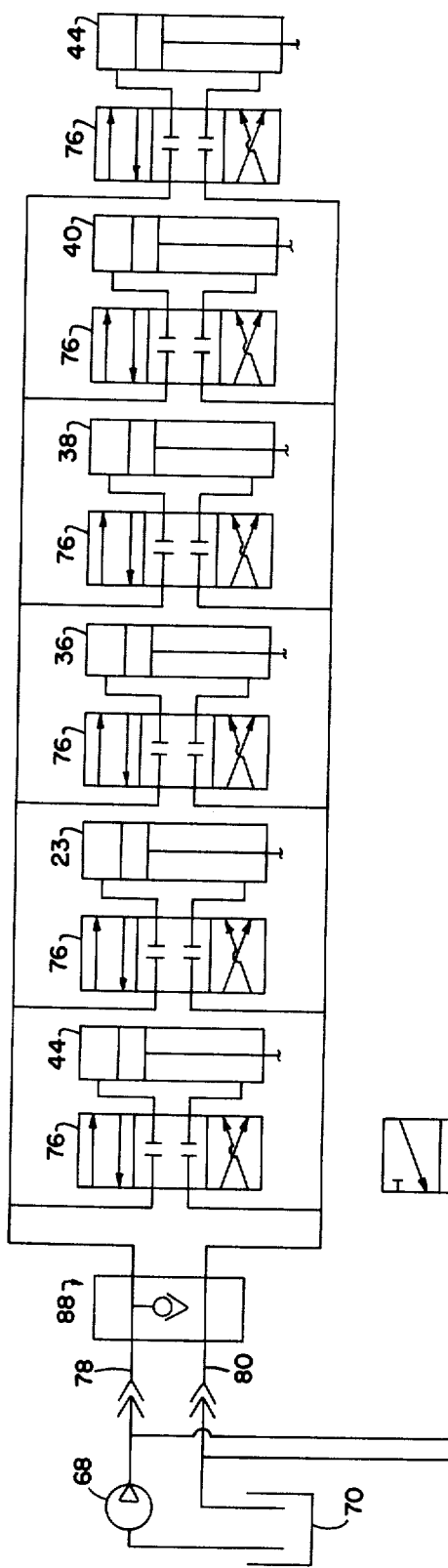
FIG. 4 is a schematic representation of a simplified version of the hydraulic system embodying the valve shown in FIG. 3.
Figure 4:
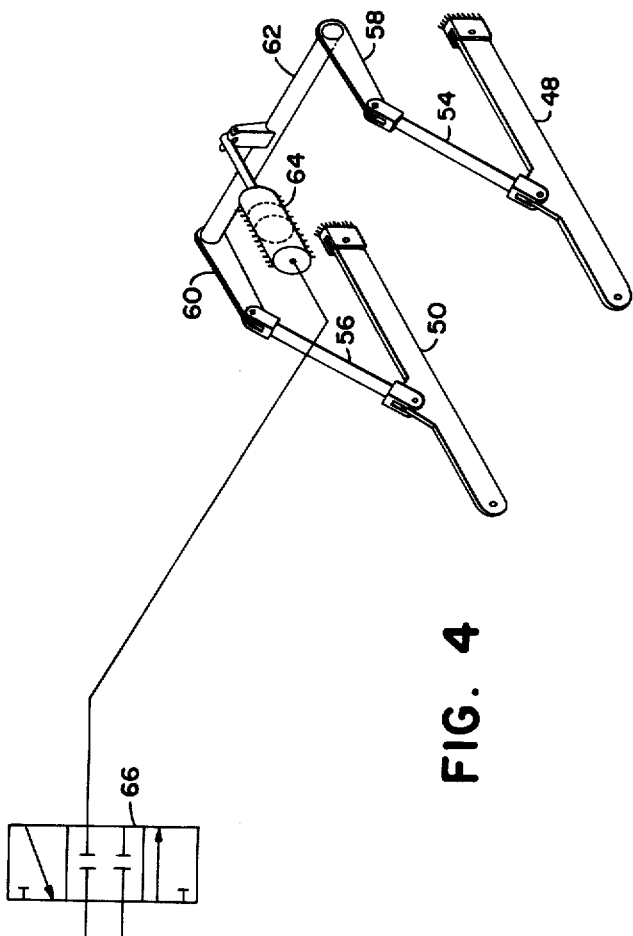

The backhoe 12 is connected to the tractor 10 through means of a conventional three-point hitch 46 coupled between the chassis 14 and main frame 20. The three-point hitch includes the usual, transversely spaced lower right and left draft links 48 and 50 and upper center link 52. The links 48, 50 and 52 are so dimensioned and connected relative to one another that they act quite similar to a parallel linkage throughout their range of vertical movement. Thus, the main frame 20 remains in a generally upright condition, as shown in FIG. 1, as it is moved by the hitch 46 from a lower normal working position (FIG. 1) to a raised transport position. For the purpose of raising and lowering the backhoe between working and transport positions, the hitch 26 includes right and left lift links 54 and 56 (FIG. 4) coupled between the right and left draft links 48 and 50 and right and left crank arms 58 and 60 fixed to the opposite ends of a rock shaft 62 journaled in the chassis 14. A one-way hydraulic actuator 64 is connected to the shaft 62 for selectively rocking the same. For controlling actuation of the actuator 64, there is provided a manually operable valve 66 connected between the actuator 64 and a pump 68 and reservoir 70, the valve 66 being shiftable in opposite directions from a neutral position (the position shown) to connect the actuator 64 either to the pump or the reservoir for respectively effecting raising or lowering of the hitch 46.

Likewise, a valve for each of the actuators on the backhoe is provided on the backhoe frame 20. Specifically, mounted on the frame 20 is a valve body 72 having six identical spool valve elements 74 (only four shown in FIG. 2) mounted for vertical movement therein. The body 72 and valve elements 74 in effect define six different control valves 76 (FIG. 4) connected in parallel with each other and having respective inlet and outlet ports connected to pressure and return lines 78 and 80, respectively, the lines 78 and 80 in turn being respectively connected to the pump 68 and reservoir 70. Two of the valves 76, preferably those including the elements 74 at the opposite sides of the body 72, are connected to the right and left stabilizer leg actuators 44 while the remaining four valves 76 are respectively connected to the swing actuator 23, the boom actuator 36, the dipper stick actuator 38 and the bucket actuator 40 (see FIG. 4). A first pair of control levers 82 (only one shown) are respectively located above and linked in a conventional manner (not shown) to the upper ends of the two valve elements 74 at the opposite sides of the valve body 72 while a second pair of control levers 84 (only one shown) are respectively linked in a conventional manner (not shown) to the remaining four valve elements 74 such that one of the levers 84 is used to selectively control operation of the swing and boom actuators 23 and 36 while the other lever 84 is used to selectively control the boom and bucket actuators 38 and 40. Mounted on the frame 20 so as to position a seated operator within easy reach of the control levers 82 and 84 is an operator's seat 86.

The structure heretofore described is all conventional and is described for setting forth the environment in which the presently to be described invention is particularly adapted for use.

Thus, the present invention comprises a safety device for preventing a backhoe operator from causing the hitch 46 to be lifted more than a predetermined amount from its operating position, shown in FIG. 1, through actuation of one or more of the actuators 36, 38 and 40 of the backhoe 12. Specifically, the safety device comprises a dump valve 88 including a threaded valve body 90. The valve body 90 defines a vertical bore 94 intersected at a lower portion thereof by a return port 96 connected to the return line 80 and by a pressure port 98 spaced axially below the return port 96 and connected to the pressure line 78. A check ball 100 is normally held seated, by fluid pressure, against a downwardly facing seat 102 located between the port 96 and 98, the check ball 100 thus normally preventing flow from occurring between the pressure port 98 and return port 96. Vertically reciprocally mounted in the bore 94 above the check ball 100 is a valve stem 104, which is normally held away from unseating engagement with the check ball 100 by means of a coil compression spring 106 encircling the valve stem 104 and acting between respective shoulders formed on the stem 104 and the valve body 90. Received on an exposed upper end portion of the valve body 90 is a collar-like portion 108 of a bracket 110, the portion 108 being held in place by a snap ring 112. The bracket 110 extends to a location above the valve stem 104 and pivotally mounted on the bracket for vertical swinging movement in operative engagement with the valve stem 104 is a lever 114. It will be appreciated then that downward movement of the lever 114 will effect downward movement of the valve stem 104 and unseating of the check ball 100, which results in pressure fluid below the check ball 100 being dumped to the reservoir 70 via the return port 96.

The actuation of the lever 114 is accomplished automatically when the hitch 46 is swung upwardly a predetermined distance from its normal operating position illustrated in FIG. 1 through means of a mechanical linkage (see FIG. 2). This linkage comprises a generally U-shaped position-sensing bar 116 having a first leg 118 pivotally received in a transverse, horizontal tubular receptacle 119 fixed to the forward side of the backhoe main frame 20 at a location between the lower draft links 48 and 50. A second leg 120 of the bar 116 is positioned beneath the right draft link 48 and preferably is adjusted, in a manner to be presently described, so as to engage the underside of the link 48. A turnbuckle 122 has a tubular receptacle 124 fixed to the lower end thereof and received over the leg 120 to thus define a horizontal pivot connection. A tension spring 126 is connected to the lever 114 and the upper end of the turnbuckle 122 through means of upper and lower chain links 128 and 130, respectively.

The operation of the safety device is as follows. Once the backhoe 12 is connected to the tractor 10 and the hitch 46 is disposed at its normal working position wherein the draft links 48 and 50 are generally horizontal, as illustrated in FIG. 1, the turnbuckle 122 is turned, if necessary, to bring the leg 120 of the position-sensing bar 116 into snug engagement with the draft link 48. It is herenoted that the sensitivity of the safety device may be increased by tensioning the spring 126 by further operation of the turnbuckle once the bar 116 abuts the link 48.

Should the operator attempt to make the bucket 32 bite into unyielding material by using the bucket against the material by actuation of one or more of the actuators 36, 38 and 40, reaction forces may cause the hitch 46 to be swung upwardly from its working position. If the hitch 46 does raise, the angle between the backhoe frame 20 and the draft link 40 will decrease thus resulting in the bar 116 being pivoted downwardly. This motion of the bar 116 is transferred to the lever 114 by the turnbuckle 122 and spring 126 and after the hitch 46 has swung a predetermined distance upwardly, the movement of the lever 114 will depress the valve stem 104 to unseat the check ball 100. The pressure fluid which is operating the backhoe actuator or actuators is then dumped to the reservoir thus deactivating the backhoe actuator or actuators so as to prevent the operator from further raising the hitch 46 by operation of the backhoe actuators. It is to be noted that such raising of the hitch may be dangerous because the operator may be moved against structural members at the rear end of the tractor. Also such raising may result in the weight of the tractor being transferred to the connection points of the hitch 46 so as to overstress these points.

While the safety device described hereinabove includes a mechanical linkage for actuating the dump valve 88, those skilled in the art will recognize that electrical means, such as a rheostat arrangement, may be used for sensing the position of the backhoe frame 20 relative to the tractor and for effecting operation of the dump valve electrically, as by a solenoid, for example.

We claim:

1. In a combination including a backhoe having a main frame attached to a tractor by vertically swingable linkage means for guiding the main frame upwardly and toward the tractor from a normal operating position to a transport position, an operator's seat supported on the main frame, a source of fluid pressure and a reservoir mounted on one of the main frame and tractor and coupled to control valve means mounted on the main frame, the control valve means being operable to selectively actuate various hydraulic actuators of the backhoe, a safety device for preventing the main frame from being moved into close proximity to the tractor by actuation of said hydraulic actuators during operation of the backhoe, comprising: a normally closed dump valve means connected between the source of fluid pressure and the reservoir and including a shiftable means which is actuatable to connect the source of fluid pressure to the reservoir so as to disable said actuators; a sensing means connected between the main frame and link means for sensing the position of the main frame relative to the tractor; and position responsive means connected between the sensing means and the shiftable means for actuating the latter to effect an open condition in said dump valve means in response to the main frame moving to a predetermined position relative to the tractor during operation of the backhoe.

2. The combination defined in claim 1 wherein said linkage means is a three-point linkage including a pair of laterally spaced draft links and a center link, each of said links having opposite ends respectively pivotally connected to the tractor and to the main frame in such relationship to each other that as the main frame moves between its operating and transport positions it remains in a substantially upright position; said sensing means including a member vertically pivotally mounted on the main frame and having a portion underlying a portion of one of said draft links; motion transfer linkage means operatively connecting said member to said shiftable means and holding said member such that said portion thereof is at least closely adjacent said portion of the three-point linkage so as to be moved thereby as the main frame moves from its normal operating position to said predetermined position relative to the tractor; and said motion transfer means being constructed so as to transfer the movement of the member to said shiftable means so as to actuate the dump valve means to its open condition.

3. The combination defined in claim 2 wherein said member comprises a generally U-shaped rod having a first leg pivotally mounted on the main frame and a second leg disposed beneath one of said lift links; and said motion transfer linkages being coupled to said second leg.

4. The combination defined in claim 2 wherein said motion transfer linkage means includes a length-adjustable link for changing the effective length of the motion transfer linkage for the purpose of adjusting the position of said portion of the member relative to said portion of the three-point linkage.

5. The combination defined in claim 2 wherein said shiftable means of said dump valve means includes a valve stem; and said motion transfer means including a lever pivotally mounted for movement into operative engagement with said valve stem.

6. The combination defined in claim 5 wherein said motion transfer linkage means includes a length-adjustable link for changing the effective length of the motion transfer linkage for the purpose of adjusting the position of said portion of the member relative to said portion of the three-point linkage, the length adjustable link being connected between the lever and said position of said member.

7. The combination defined in claim 5 wherein said motion transfer means includes a tension spring connected between the member and said lever.

8. The combination defined in claim 6 wherein said motion transfer means includes a tension spring connected between the length-adjustable link and said shiftable means.

9. In combination with a tractor including a three-point hitch comprising a pair of laterally spaced draft links and an upper center link, a backhoe including a main frame pivotally connected to the draft links and upper center link and movable therewith about a horizontal axis between a lower working position and a raised transport position; an operator seat support on the main frame, a valve block supported on the main frame and including inlet and exhaust ports respectively connected by means of first and second fluid hoses to a source of fluid pressure and a reservoir embodied in the tractor, a plurality of hydraulic actuators operatively mounted on the backhoe and said valve block including valving for selectively connecting the source of fluid pressure and the reservoir to the actuators, the improvement comprising a safety device for preventing the backhoe main frame from being moved more than a predetermined amount toward said tractor about said horizontal axis by any operation of the actuators of the backhoe comprising: a normally closed dump valve connected between said source of fluid pressure and said reservoir and including actuatable means operable for connecting said source of fluid pressure to the reservoir; valve actuator means operatively connected between said backhoe frame and said draft links, and to said actuatable means, for sensing the disposition of said main frame relative to said tractor and for operating said actuatable means when the main frame is moved more than said predetermined amount toward said tractor.

* * * * *